United States Patent
Greaves et al.

(10) Patent No.: US 7,072,056 B1
(45) Date of Patent: Jul. 4, 2006

(54) APPARATUS AND METHOD FOR TRANSLATING AND SENDING DIGITAL INFORMATION TO DIFFERENT TYPES OF RECEIVING DEVICES

(75) Inventors: Warren J. Greaves, Boise, ID (US); Stephen Holmstead, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 403 days.

(21) Appl. No.: 09/571,948

(22) Filed: May 15, 2000

(51) Int. Cl.
*G06F 15/00* (2006.01)
*G06K 1/00* (2006.01)

(52) U.S. Cl. ............... 358/1.15; 358/1.1; 358/1.16; 709/230

(58) Field of Classification Search ........ 358/1.15, 358/1.13, 1.14, 1.16, 1.1, 1.9, 1.11; 382/245; 709/230
See application file for complete search history.

(56) References Cited

U.S. PATENT DOCUMENTS

| 6,298,164 | B1 * | 10/2001 | Suzuki et al. | 382/245 |
| 6,330,611 | B1 * | 12/2001 | Itoh et al. | 709/229 |
| 6,349,304 | B1 * | 2/2002 | Boldt et al. | 707/102 |

* cited by examiner

*Primary Examiner*—Gabriel Garcia
*Assistant Examiner*—Thierry Pham

(57) ABSTRACT

A digital information translation and sending device is provided for sending data to a targeted destination device. The translation and sending device includes a sending device and a gateway device. The sending device includes memory and a communication port. The communication port is operative to send digital data in a first data format compatible with the sending device via a first communications protocol. The gateway device includes processing circuitry, memory, and a communication port. The communication port and processing circuitry are operative to convert the digital data from the first data format to a second data format that is compatible with a destination device and sends the data using a second communications protocol. A method is also provided.

10 Claims, 3 Drawing Sheets

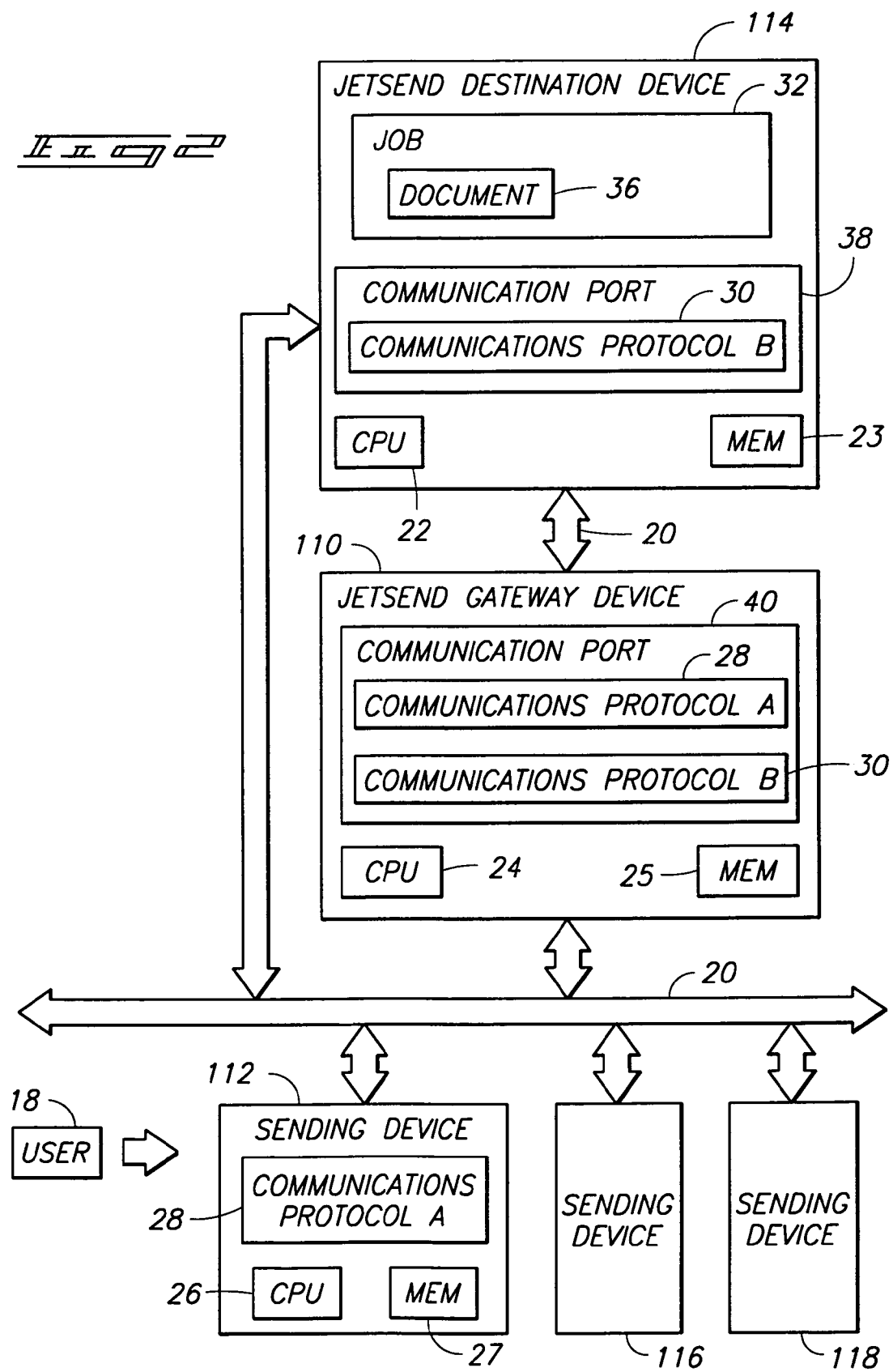

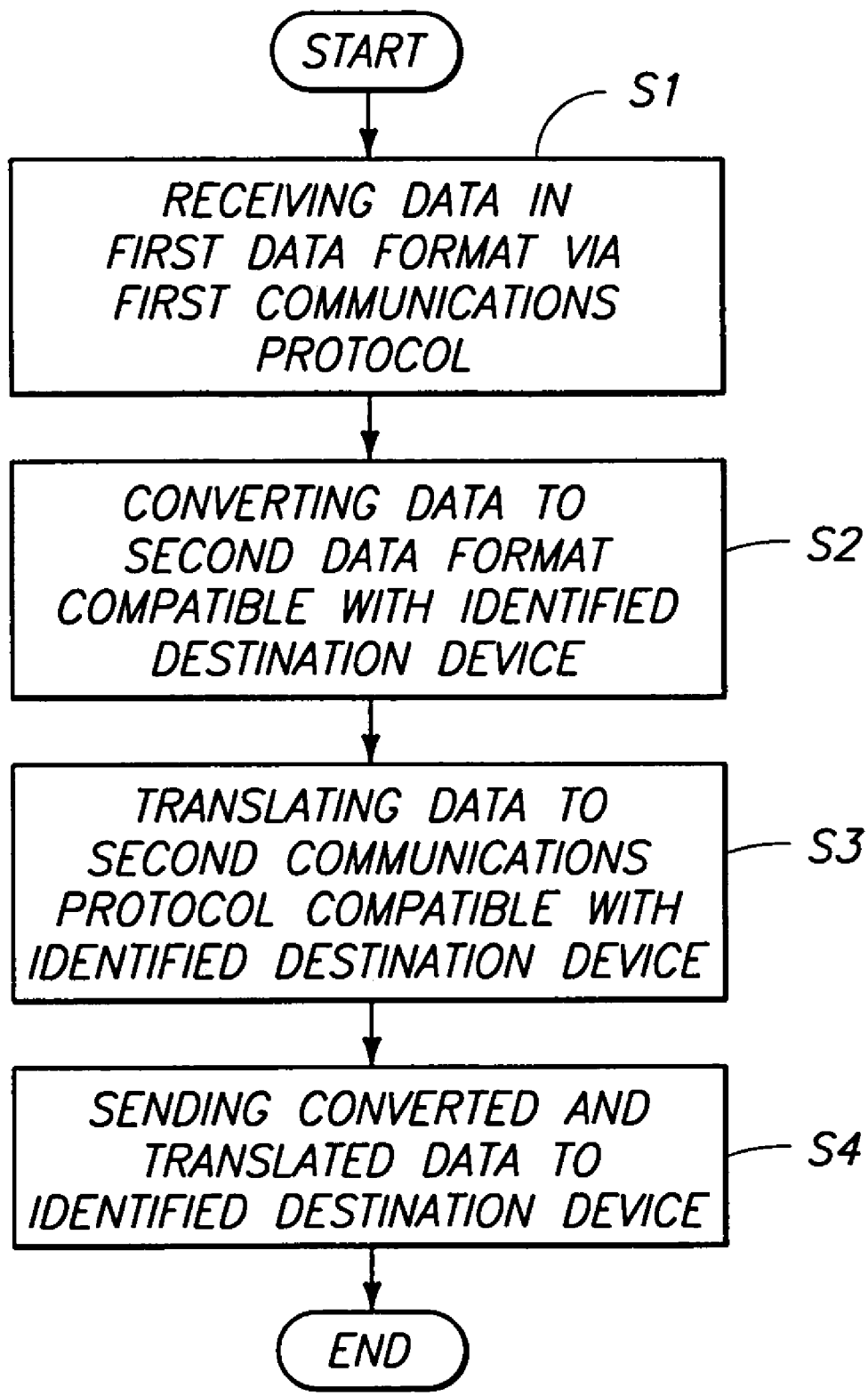

APPARATUS AND METHOD FOR TRANSLATING AND SENDING DIGITAL INFORMATION TO DIFFERENT TYPES OF RECEIVING DEVICES

FIELD OF THE INVENTION

This invention pertains to the transmission of information between devices within a network environment. More particularly, this invention relates to the translation and sending of digital information between a sending device and one of several different types of receiving devices.

BACKGROUND OF THE INVENTION

Hewlett Packard Company, assignee of the present invention, has developed a direct communications technology, JetSend, for multiple devices within a network environment. For example, network devices such as printers, scanners, and digital cameras are rendered with the ability to communicate independently of any specific server or application by using Internet Protocol (IP) addressing over an intranet or the Internet. Details of such JetSend technology are described at Applicant's website: www.jetsend.com, herein incorporated by reference.

JetSend enabled devices use a JetSend protocol to communicate. However, devices that use the JetSend protocol will only communicate with other JetSend devices. Therefore, there exists a need to enable communication between heterogeneous devices in order to render inter-operability between such devices.

SUMMARY OF THE INVENTION

An apparatus and method are provided for translating and sending digital information to different types of receiving devices.

According to one aspect, a digital information translation and sending device is provided for sending data to a targeted destination device. The translation and sending device includes a sending device and a gateway device. The sending device includes memory and a communication port. The communication port is operative to send digital data in a first data format compatible with the sending device via a first communications protocol. The gateway device includes processing circuitry, memory, and a communication port. The communication port and processing circuitry are operative to convert the digital data from the first data format to a second data format that is compatible with a destination format and sends the data using a second communications protocol.

According to another aspect, a digital information translation device is provided including a gateway device. The gateway device includes processing circuitry, memory, and a communication port. The gateway device is configured to transfer digital data with a sending device in a first data format using a first communications protocol. The communication port and the processing circuitry cooperate to convert the digital data between the first data format and a second data format that is compatible with a destination device. The communication port and the processing circuitry transfer the data using a second communications protocol.

According to yet another aspect, a method is provided for transmitting digital information between heterogeneous devices. The method includes: receiving digital data in a first data format from a sending device having a communication port with a first communications protocol; converting the digital data from the first data format to a second data format compatible with an identified destination device; translating the digital data from the first communications protocol to a second communications protocol compatible with the identified destination device; and sending the converted and translated digital data to the identified destination device using the translated second communications protocol.

DESCRIPTION OF THE DRAWINGS

The protection sought is not to be limited to the disclosed embodiments, which are given by way of example only, but instead is to be limited only by the scope of the appended claims.

FIG. 2 is a schematic block diagram illustrating an optional implementation of a gateway device enabling conversion of data so a user can send data from one of a number of dissimilar sending devices to a standard receiving device according to another aspect of the invention.

FIG. 3 is a process flow diagram illustrating the steps involved in translating and sending digital information to different types of receiving devices according to one aspect of the invention.

DETAILED DESCRIPTION OF THE INVENTION

Figure 1:
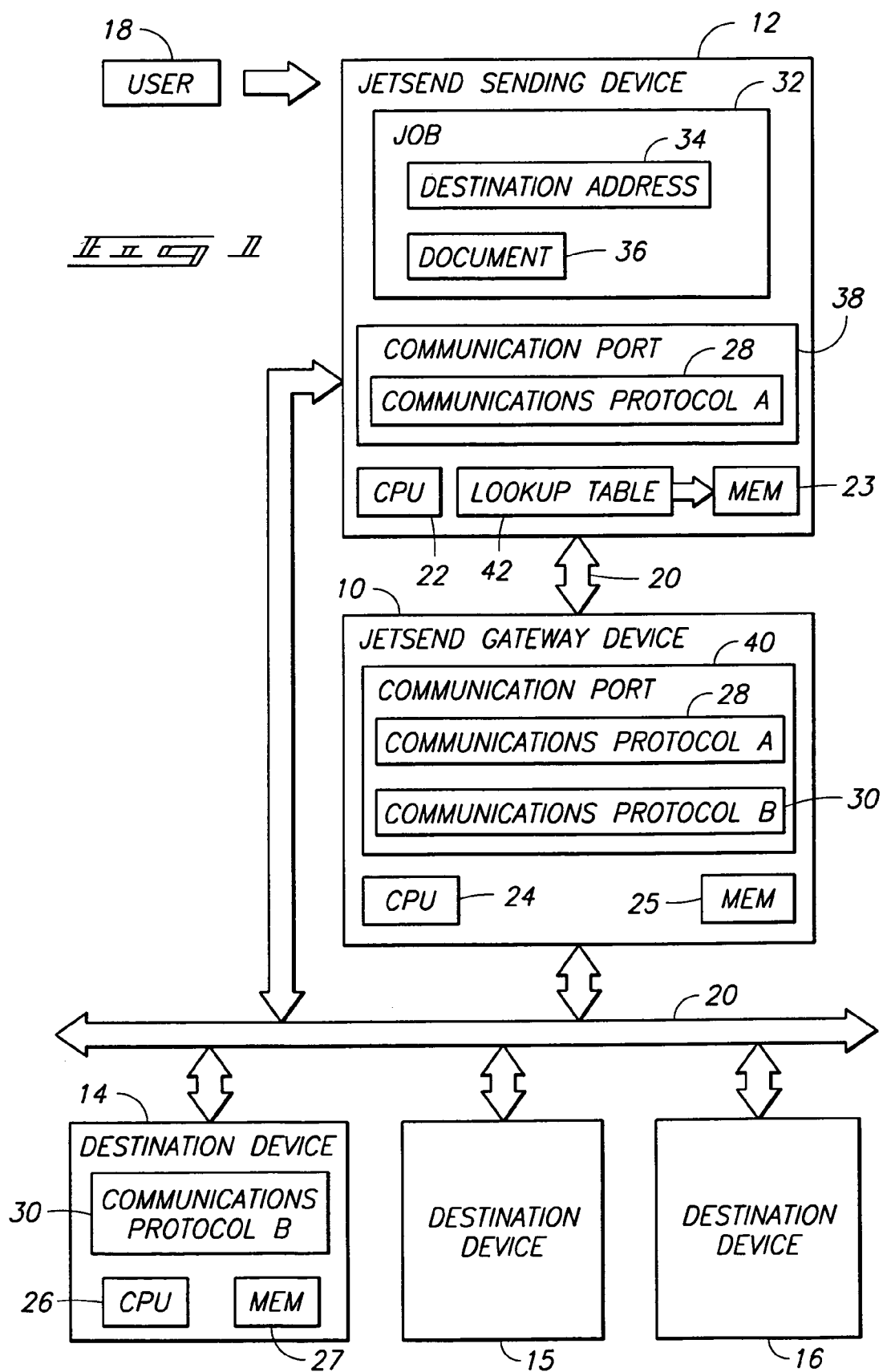
FIG. 1 is a schematic block diagram illustrating a gateway device enabling conversion of data so a user can send data from a standard sending device to a targeted destination device according to one aspect of the invention.

This disclosure of the invention is submitted in furtherance of the constitutional purposes of the U.S. Patent Laws "to promote the progress of science and useful arts". U.S. Constitution, Article 1, Section 8.

Reference will now be made to a preferred embodiment of Applicant's invention. One exemplary implementation is described below and is depicted with reference to the drawings comprising a JetSend gateway device. While the invention is described via a preferred embodiment usable with JetSend sending devices, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

For purposes of this disclosure, the term "gateway device" is understood to be a "gateway". Accordingly, a "gateway device" is a computer that is configured to perform protocol conversion between different applications, devices and/or networks. A router is understood to provide one aspect of a "gateway device".

Also for purposes of this disclosure, the term "protocol" is understood to refer to the rules that govern the transmission and reception of data. A "communications protocol" refers to the hardware and software standards governing transmission of data between two stations. For example, one type of Internet connection uses TCP/IP as a transmission protocol, on an IEEE LAN using 100BaseT pursuant to an IEEE 802.3u standard.

Further for purposes of this disclosure, the term "JetSend" refers to a direct communications technology and communications protocol developed by Hewlett-Packard Company, assignee of the present invention. Further details of the JetSend communication protocol are described at www.jetsend.hp.com/press/Whitepaper.html, the teachings of which are incorporated herein by reference. Additional details regarding JetSend communications are described in U.S. patent application Ser. No. 09/059,867, entitled "Method and Apparatus for Device Interaction by Protocol", filed Apr. 14, 1998, naming Peter M. Williams and Patrick S. Arnold as inventors, and incorporated herein by reference, and U.S. patent application Ser. No. 09/059,909, entitled "Method And Apparatus For Device Interaction by Format", filed Apr. 14, 1998, naming Peter M. Williams, Patrick S. Arnold, Frederik Willerup and Anthony Sowden as inventors, and incorporated herein by reference.

FIG. 1 depicts a gateway device identified by reference numeral 10. Gateway device 10 enables conversion of data so a user can send data from a standard sending device 12 to one or more targeted destination devices 14–16. It is understood that destination devices 14–16 can be of dissimilar device types, wherein each device uses a unique destination communications protocol and a unique destination data type. Accordingly, destination devices 14–16 comprise heterogeneous devices, with respect to each other as well as with respect to sending device 12. Gateway device 10 imparts inter-operability between gateway device 10 and any one or more of devices 14–16.

According to an optional implementation, a gateway device 110 enables conversion of data so a user can send data from one of a number of dissimilar sending devices 112, 116, and 118 to a standard receiving device 114. Such optional implementation is described below in greater detail with reference to FIG. 2.

As shown in FIG. 1, sending device 12 includes job 32, communication port 38, central processing unit (CPU) 22, memory 23, and lookup table 42. Lookup table 42 is stored in memory 23, and is accessed using CPU 22. Lookup table 42 comprises an array or matrix of data that contains searchable values for destination addresses and destination device types. CPU 22 comprises processing circuitry that cooperates with communication port 38 and memory 23.

Gateway device 10 comprises communication port 40, CPU 24, and memory 25. CPU 24 comprises processing circuitry that cooperates with communication port 40 when converting and translating digital data.

According to one aspect, sending device 12 comprises a standard JetSend sending device utilizing JetSend protocol from Hewlett-Packard Company, of Palo Alto, Calif. However, it is understood that sending device 12 can be any device capable of sending data via a first communications protocol, with a targeted destination device using a second, different communications protocol, wherein data is also converted from a first data format to a second data format.

For the case of a JetSend sending device 12, the usefulness of a JetSend sending device is extended because device 12 is rendered with the ability to communicate with a mixed variety of existing devices, as well as with JetSend enabled devices. For example, a JetSend sending device 12 can communicate with facsimile machines, e-mail servers, and other devices having communications protocols that have yet to be defined. According to one construction, sending device 12 comprises an HP 9100C Digital Sender available from Hewlett-Packard Company, of Palo Alto, Calif.

A user 18 interacts with JetSend sending device 12 to send data from sending device 12 via a JetSend gateway device 10 and a communication link 20 to a targeted destination device 14 of destination devices 14–16. Data in the form of a job 32 is sent from device 12 to gateway device 10 where the data is converted in order to be compatible with the target destination device 14. A communication port 40 of gateway device 10 is configured to convert communication protocols for data that is delivered from device 12 to a protocol recognized by the targeted destination device 14.

For example, communication port 40 converts from communications protocol "A" 28 to communications protocol "B" 30. Additionally, data is converted from a first data format to a second data format by gateway device 10.

In operation, a user 18 submits a job 32 via JetSend sending device 12 and JetSend gateway device 10 to destination device 14. According to one aspect, job 32 comprises a print job. Furthermore, job 32 comprises a destination address 34 and a document 36. User 18 supplies destination address 34 along with document 36 which is to be transferred to destination device 14. Sending device 12 first looks at destination address 34 and document 36. Sending device 12 then determines the destination device type for destination device 14. Such determination is carried out in one of two ways: by resolving destination device type using a lookup table 42 within sending device 12, or by broadcasting a message to devices 14–16 through gateway device 10.

Upon determining the destination device type, a JetSend gateway of the type asked for will reply if one is available. Sending device 12 then knows a JetSend destination for the data, and sending device 12 uses JetSend information exchange protocol to send the job to gateway 10. After the job is received at gateway 10, the data is converted into an appropriate destination type. Finally, gateway 10 connects to destination device 14 using communication port 40 and the destination communications protocol "B" 30. Gateway 10 then sends the converted data to destination device 14.

For example, an HP 9100C digital sender, from Hewlett-Packard Company, of Palo Alto, Calif., can be used to send a 300 dpi letter-sized monochrome image to a JetSend facsimile gateway. Such a gateway would convert the 300 dpi image into a 200 dpi image comprising a standard facsimile type. The resulting image is then sent to a remote facsimile machine. It is understood that a telephone number for a destination facsimile machine, or destination device, would be delivered to gateway 10 in the form of a destination address.

According to the implementation depicted in FIG. 1, a plurality of destination devices 14–16 communicate with receiving device 12 via gateway device 10 and communication link 20. According to one implementation, communication link 20 comprises a network bus. Destination devices 14–16 each comprise a different, or unique type of receiving device, wherein each device 14–16 can be targeted by sending device 12 to receive digital data from sending device 12. It is understood that sending device 12 is heterogeneous with each of destination devices 14–16.

Accordingly, each destination device 14–16 has a unique type of communications protocol that is different than the communications protocol used by sending device 12. In one instance, sending device 12 comprises a JetSend sending device, gateway device 10 comprises a JetSend gateway device, and destination device 14 comprises a facsimile machine using a facsimile protocol. Optionally, destination device 14 comprises an e-mail server using a simple mail transfer protocol (SMTP).

In order to rectify the dissimilar communications protocols between a sending device and a destination device, gateway 10 converts the communications protocol. Additionally, gateway device 10 allows a user to send data from a standard sending device, such as a JetSend sending device, by converting the data to an appropriate data type compatible with a targeted destination device. After converting the data type and translating the communications protocol, gateway device 10 sends the converted data via the translated communications protocol to a targeted destination device.

For the case where gateway 10 is a JetSend gateway, a user is provided with the ability to send documents to multiple heterogeneous devices using a single, common JetSend sender and a JetSend gateway.

Accordingly, not only does the data have to be converted to an appropriate data type, but the device communication will have to be conducted using a specific type of communications protocol that is compatible with the targeted destination device.

Pursuant to one embodiment, gateway device 10 uses JetSend protocol on one side and one or more different protocols on another side. This overcomes the prior art problem wherein current JetSend enabled devices use JetSend protocol, and can only communicate with other JetSend devices. As a result of implementing gateway 10, heterogeneous devices are rendered inter-operable, and the resulting functionality gives users enhanced flexibility and device capability.

For the case where sending device 12 comprises a JetSend sending device and destination device 14 comprises a facsimile machine, digital data is converted from a first data format comprising a JetSend data format to a second data format comprising a Group 4 facsimile data format. The communications protocol is furthermore converted from a JetSend protocol to a facsimile protocol. Hence, a JetSend job is converted and sent out as a standard facsimile job via gateway 10 which comprises a JetSend facsimile gateway.

For the case where sending device 12 comprises a JetSend sending device and destination device 14 comprises an e-mail server using a simple mail transfer protocol (SMTP), digital data is converted from a first data format comprising a JetSend data format to a second data format comprising a portable document format (PDF). The communications protocol is furthermore converted from a JetSend protocol to a simple mail transfer protocol (SMTP). Hence, a JetSend job is converted and sent out as a standard facsimile job via gateway 10 which comprises a JetSend email server gateway.

For the case where destination device 14 comprises a facsimile machine, gateway 10 comprises a JetSend facsimile gateway that is operative to convert a pixelated image from a first image resolution to a second image resolution. For example, gateway 10 can convert a 300 dpi image to a 200 dpi image that is compatible with a standard facsimile data type.

FIG. 2 illustrates an alternative embodiment wherein a gateway device 110 enables conversion of data so a user can send data from one of a number of dissimilar sending devices 112, 116, and 118 to a standard JetSend destination device 114. As shown in FIG. 2, destination device 114 comprises a JetSend destination device wherein a job 32 is received by way of communication port 38 via JetSend gateway device 110 through a communication link 20 and from a sending device 112. Sending device 112 includes a communications protocol "A" 28, whereas communication port 38 includes a communications protocol "B" 30.

JetSend gateway device 110 includes communication port 40, comprising communications protocol "A" 28 and communications protocol "B" 30. Communication port 40 is analogous to communication port 40 (of FIG. 1), wherein digital data from sending device 112 is converted from a first data format to a second data format, and the manner in which the data is sent is converted from a first communications protocol "A" 28 to a second communications protocol "B" 30.

In this manner, a JetSend destination device 114 can receive jobs from any of a number of heterogenous, or dissimilar, sending devices 112–118 utilizing JetSend gateway device 110 to convert the data type and the communications protocol from a type and protocol recognized by each sending device into a data type and protocol compatible with JetSend destination device 114. Hence, JetSend gateway device 110 operates similar to device 10 (in FIG. 1), but information is transferred in the opposite direction.

FIG. 3 is a process flow diagram illustrating the steps involved in translating and sending digital information to different types of receiving devices according to one aspect of the invention.

In Step "S1", the process is initiated by receiving digital data in a first data format from a sending device having a communication port with the first communications protocol. After performing Step "S1", the process proceeds to Step "S2".

In Step "S2", the process proceeds by converting the digital data from the first data format to a second data format that is compatible with an identified destination device. After performing Step "S2", the process proceeds to Step "S3".

In Step "S3", the process proceeds to translating the digital data from the first communications protocol to a second communications protocol that is compatible with the identified destination device. After performing Step "S3", the process proceeds to Step "S4".

In Step "S4", the process proceeds to sending the converted digital data to a targeted destination device using the translated second communications protocol. After performing Step "S4", the process either terminates, or proceeds back to Step "S1".

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A digital information translation and sending device for sending data to a targeted destination device, comprising:
   a sending device including memory and a communication port, the communication port operative to send digital data in a first data format compatible with the sending device via a first communications protocol; and
   a gateway device including processing circuitry, memory, and a communication port, the communication port and processing circuitry operative to convert the digital data from the first data format to a second data format compatible with a destination device and send the data using a second communications protocol, the existence of the targeted destination device is determined by broadcasting a message to at least one associated destination device through the gateway device, wherein the sending device is configured to send the digital data in the first data format to the gateway device after receiving an indication of the availability of the targeted destination device from the gateway device, wherein the sending device comprises a look-up table comprising a plurality of destination addresses and destination device types, the existence of the targeted destination device being determined by using the look-up table, wherein the data is received by the gateway from the sending device and the data is converted to the destination format compatible with an identified destination device type.

2. The device of claim 1 wherein the sending device comprises a JetSend device, and the gateway device comprises a JetSend gateway device.

3. The device of claim 2 wherein the sending device sends digital data in a JetSend data format to the gateway device, the gateway device translates the data from a JetSend data format to the second data format, and the gateway device receives JetSend data via a JetSend communications protocol and sends the JetSend data in the second data format via a destination communications protocol.

4. The device of claim 1 wherein the first communications protocol comprises a JetSend protocol, and the second communications protocol comprises a facsimile protocol.

5. The device of claim 1 wherein the first data format comprises a JetSend format, and the second data format comprises a facsimile format.

6. The device of claim 1 wherein the first data format comprises a JetSend format, and the second data format comprises a portable document format (PDF).

7. The device of claim 1 wherein the gateway comprises a JetSend facsimile gateway operative to convert a pixelated image from a first image resolution to a second image resolution.

8. The device of claim 1 wherein the second communications protocol comprises a simple mail transfer protocol (SMTP).

9. The method of claim 1 wherein the second communications protocol comprises a facsimile protocol, the second data format comprises a facsimile format, and the destination device comprises a facsimile machine.

10. The method of claim 1 wherein the second communications protocol comprises a simple mail transfer protocol (SMTP), the second data format comprises a portable document format (PDF), and the destination device comprises an e-mail server.

* * * * *